United States Patent [19]

Zhang et al.

[11] Patent Number: 5,332,543
[45] Date of Patent: Jul. 26, 1994

[54] METHOD FOR PRODUCING ARTICLES FROM PARTICULATE MATERIALS USING A BINDER DERIVED FROM AN IDEALIZED TGA CURVE

[75] Inventors: Jian G. Zhang; Dunstan H. Peiris; Jun W. Zhao; Sow W. Loh, all of Singapore, Singapore

[73] Assignee: Advanced Materials Technologies Pte Ltd, Singapore

[21] Appl. No.: 935,818

[22] Filed: Aug. 26, 1992

[51] Int. Cl.$^5$ ............................................. B22F 1/00
[52] U.S. Cl. ............................................. 419/36; 525/51
[58] Field of Search ......................... 419/36, 37; 525/51

[56] References Cited

U.S. PATENT DOCUMENTS 4,874,030 10/1989 Kuphal et al. ........................ 164/34

Primary Examiner—Donald P. Walsh
Assistant Examiner—Anthony R. Chi
Attorney, Agent, or Firm—Blakely, Sokoloff, Taylor, Zafman

[57] ABSTRACT

The disclosure relates to a binder, and the method of formulating the said binder, which is suitable for shaping parts from metallic and/or ceramic particles by injection molding. The binder comprises materials that are mainly thermoplastics, each of which having a percentage that is determined by its thermogravimetric analysis (TGA) profile and a weight loss versus temperature profile that is designed for the binder to allow highest binder removal rate from a green body by progressive heating. The removal of this binder from the green body is performed within a much shorter period of time than those published in the prior art. An example binder comprises 40-70% HDPE, 18-30% Paraffin wax, 10-25% microcrystalline wax and 2-5% stearic acid. Another binder comprises 35-65% PP, 23-35% paraffin wax, 10-25% microcrystaline wax and 2-5% stearic acid.

4 Claims, 4 Drawing Sheets

METHOD FOR PRODUCING ARTICLES FROM PARTICULATE MATERIALS USING A BINDER DERIVED FROM AN IDEALIZED TGA CURVE

BACKGROUND OF THE INVENTION

1. FIELD OF THE INVENTION

This invention relates to a binder used in shaping articles from particulate materials for manufacturing high precision, high density and high integrity engineering parts from particulate materials, such as metal powders or particles, ceramic powders or particles or the like by injection molding or similar processes, and the method of formulating the binder.

2. ART BACKGROUND

Injection molding processes have increasingly been used to form articles from particulate materials. This process enables the formation of small parts with more complex geometry at even lower cost than conventional forming processes.

Classically, particulate materials are mixed with a binder and then injection molded into a desired configuration which is generally called a green body. The binder contained in the green body is removed by thermal degradation prior to sintering. The body is sintered to obtain the desired part with 90–96% density of the theoretical.

The binder plays a key role in the injection molding process. As a carrier, it facilitates flow and packing of the particulate materials into the mold cavity and holds the particles in the shape of the mold after the part is ejected. When the green body is successfully formed, the binder finishes its function as a carrier and needs to be removed from the green body prior to sintering. The removal of the binder is performed by means of thermal heating, or solvent washing, or combinations thereof. This removal has to be fast, without creating any defects in the green body configuration or leaving behind any residues which hinder densification of the body during sintering.

The selection of a binder is generally based on its flow characteristics. The slow binder removal process required in this process remains the major drawback of the process despite the disclosure of various binders in the art. Much effort has been directed towards reducing the debinding time through change of debinding techniques. This invention permits a reduction in debinding time of thermal degradation through the formulation of binder systems which are not disclosed in the prior art.

SUMMARY OF THE INVENTION

Accordingly, it is a general object of this invention to provide a novel binder for powder injection molding that is superior to the binders of the prior art.

It is another object of the present invention to provide a method for binder formulation which is solely based on thermogravimetric analysis (TGA) to determine the quantity of each binder constituent.

It is still another object of the present invention to provide an improved binder suitable for injection molding obtaining high packing and removal by thermal degradation such that it does not create any defects in the molded article.

It is still a further object of the present invention to provide a process of binder removal by progressively heating the green body that contains the said binder such that it is faster than the prior art and it does not damage the part integrity.

These and other objects, as well as the scope, nature and utilization of the invention will be apparent from the following summary and detailed description of the present invention.

DETAILED DESCRIPTION OF THE INVENTION

A binder generally contains multiple components that are usually thermoplastics and some additives like stearic acid for wetting and lubrication. Binders formed from various combinations of these materials or ingredients have been published. However, all the binders in the prior art suffer from a common problem, namely an excessively long time is required for their removal. The inventors have found that a binder can be so formed that it offers both better injectability at a higher than normal powder loading and reduction in debinding time.

In accordance with one aspect, the present invention provides a method of forming the binder and the said binder suitable for injection molding. In the other, the present invention provides a process of binder removal which involves thermal degradation of the said binder and achieves total removal in shorter time without creating any defects in the molded article than the prior art.

In the prior art, a binder contains, generally, a wax and/or fat component, which has a lower melting temperature and degrades at a lower temperature than the second component, the thermoplastic, which begins to degrade only after the first component has been fully removed from the green body. To this end, in the prior art the debinding process has to be performed by providing for an extensively and excessively long holding period at the low temperature end, thus rendering an unnecessarily long debinding time.

Figure 1:
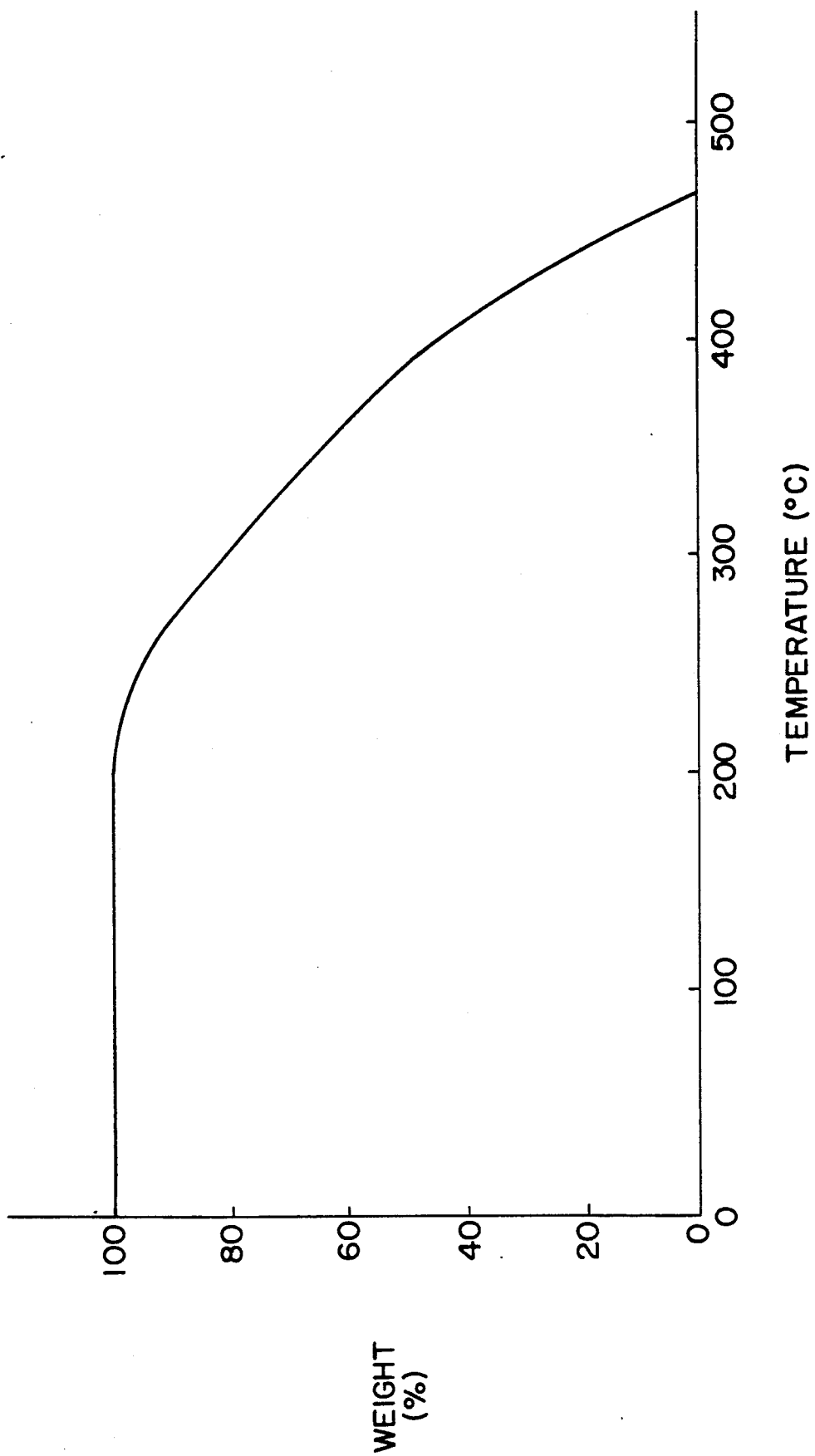
FIG. 1 is a graph of an ideal profile of the weight loss of the binder versus the degradation temperature. The degradation temperature begins above the processing temperature and is in the range of 200° to 500° C.

The present binder comprises thermoplastics such as high density PE and PP, and waxes and acids. Differing from the binders published in the prior art, the present binder is so formed and the composition is so chosen that the size of the plateau on the degradation curve between the waxes and polymers is minimized or eliminated. Thus, the elimination of holding at the low temperature for a long time and the reduction of total debinding time are achieved. The present binder is formed following the procedures below:

First of all, an ideal profile of the weight loss of the binder versus the degradation temperature, as shown in FIG. 1, is designed for the binder to be formed. The degradation temperature begins above the processing temperature and is in the range of 200° to 500° C.

Secondly, a series of thermogravimetric analysis tests are carried out on the selected, commercially available thermoplastics, waxes and surfactant. In this case, high density polyethylene (PE), polypropylene (PP), ethylene vinyl acetate (EVA), polystyrene, Paraffin Wax, microcrystalline wax, PE wax and stearic acid are chosen.

Thirdly, the selection of binder components is performed according to the thermogravimetric analysis curves and the degradation temperature range of the chosen material, and an appropriate amount of the chosen material is so determined that the thermogravimetric analysis curve from the formed binder resembles the ideal thermogravimetric analysis curve (FIG. 1) designed for the binder.

Figure 2:
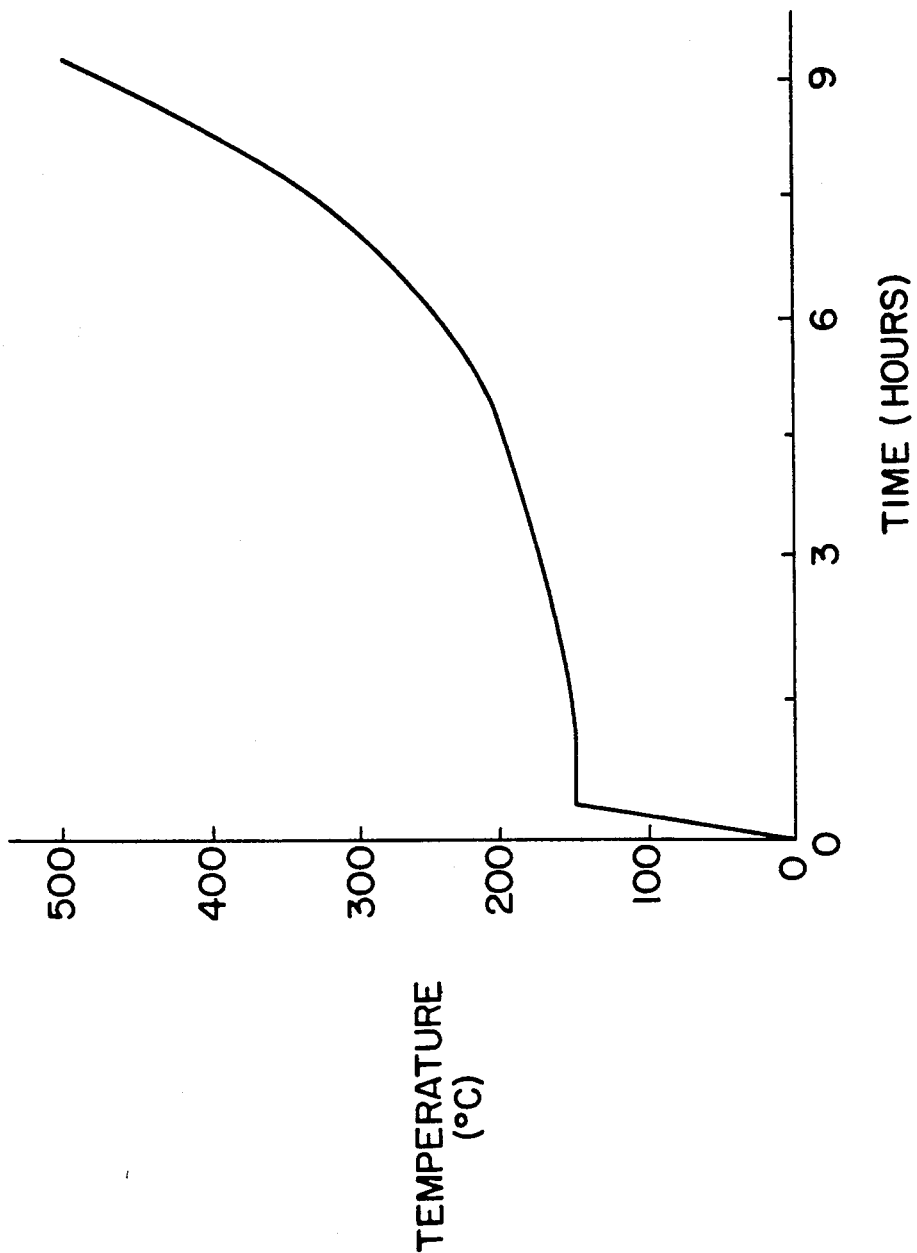
FIG. 2 is a graph of a debinding heating up profile for the trial binder formulation of the present invention.

Finally, a debinding heating up profile is established for the trial binder formulation on the basis of the thermogravimetric analysis of each individual component, which is shown in FIG. 2.

The inventors have found that the composition of a multiple-component binder can be formulated according to the above explained method. The ideal weight loss versus temperature curve (FIG. 1) is designed taking into consideration the following: the vapor pressure generated by that amount of binder at the specified temperature does not create any defects such as blister or bloating in the green body. The lower limit of the temperature range may vary depending on the temperature for injection molding. A general rule is that there should not be any or should only be a minimum of controlled binder loss during injection molding. Otherwise, there will be problems in volume loading control and, therefore, a loss of control of part dimensions during sintering. Moreover, the binder loses its recycle ability so that heavy waste of raw materials occurs. The upper limit of the temperature range is specified based on the fact that at temperatures higher than this limit polymer materials used for binder decomposed completely and that at even higher temperatures sintering starts.

Figure 3:
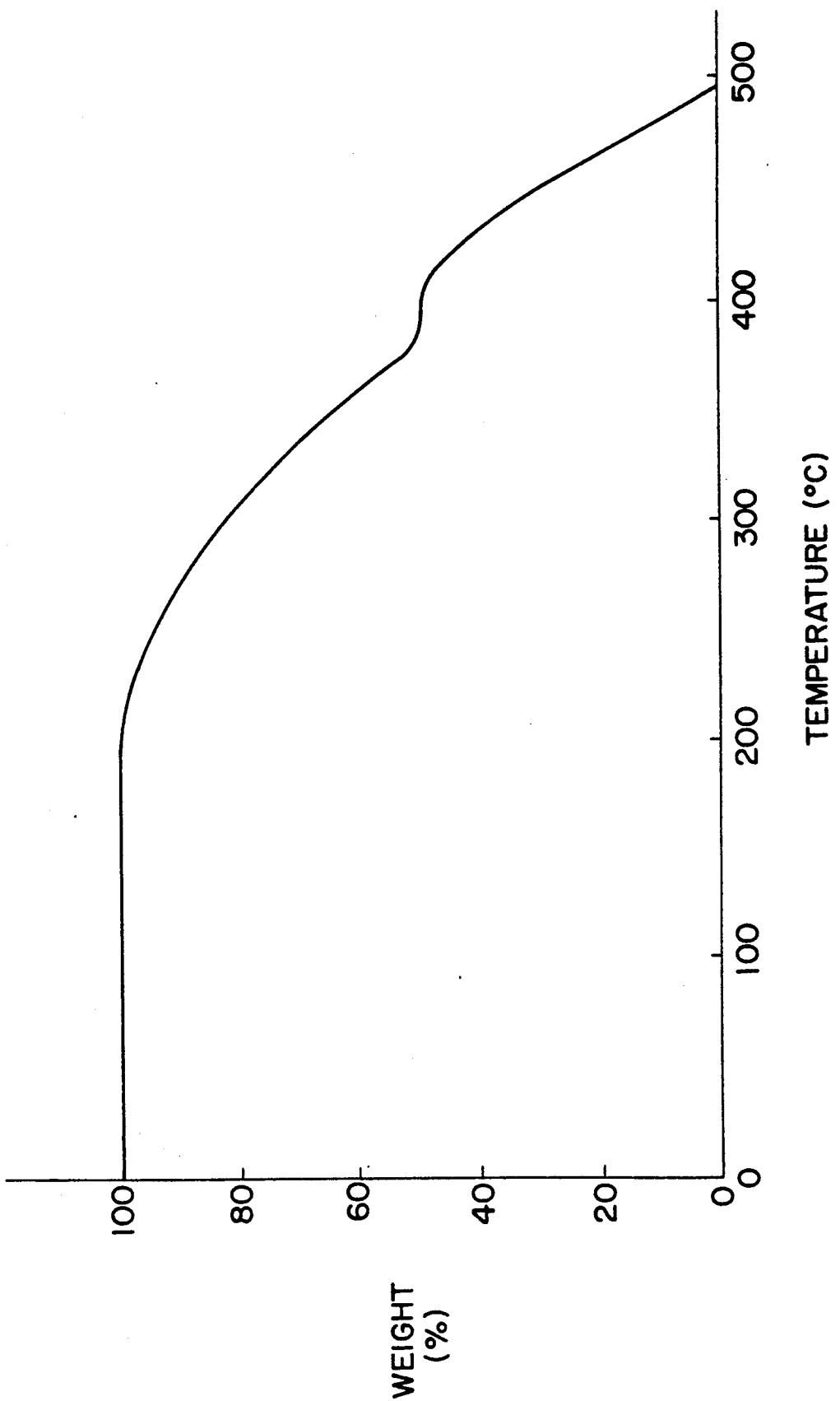
FIG. 3 is a graph of a thermogravimetric analysis profile of the binder of Example 1.

With the desired profile shown in FIG. 1, formulation of a binder starts with the selection of candidate binder component materials. Generally, materials that meet binder requirements are waxes and thermoplastics. In order to formulate a binder that has a weight loss versus temperature profile similar to that in FIG. 1, available binder materials are studied by thermogravimetric analyses (TGA). The resulting TGA profiles provide a basis for the selection of the binder component and the calculation of the composition of a binder formulation. The TGA profile of this trial binder may be different from that in FIG. 1 and optimization of the formulation by changing the percentages of the binder components is generally necessary. It may occur that the TGA profile has a plateau as shown in FIG. 3. The existence of such a plateau is not desirable because it makes debinding time unnecessarily long as nothing is evaporating during the heating at the temperature range of the plateau. To minimize or eliminate such a plateau, it is desirable to add into the binder another component which degrades at the temperature range of the plateau.

A binder that has a weight loss versus temperature profile in FIG. 1 allows a fast heating profile of FIG. 2 to be used for binder removal from the green body containing the said binder. The initial heating up to the temperature 10° to 50° C. above the highest melting point of the binder component is carried out at a rate of 300° to 500° C./h. Retention at this temperature for some time, typically 1 to 2 hours, is to relieve the residual stresses induced by injection molding, as well as to initiate the creation of microchannels so that during the subsequent heating the vapor generated by the binder can freely come out of the green body. This retention is required for the continued fast subsequent heating up without causing any blistering, bloating, slumping or distortion. The rate of weight loss at any specific temperature is made to be high as possible without creating any internal defects in the part. The profile is relatively flat initially since the microchannels are very fine. As the temperature increases, the slope of the profile is getting deeper because those microchannels are now enlarging. A much higher binder removal rate is achievable when some 60% of the binder has been removed. The progressively accelerated heating profile shown in FIG. 2 enables the total binder removal to be performed within less than 9 hours.

The present invention is described in greater detail with reference to the following examples.

EXAMPLE 1

Polyethylene, paraffin wax, microcrystalline wax and stearic acid were selected as candidate binder components. A binder was formulated that had the composition as follows:

| MATERIAL | W.T. % |
|---|---|
| HDPE | 50 |
| PW2 | 20 |
| MC WAX | 25 |
| STEARIC ACID | 5 |

The TGA profile of the binder is shown in FIG. 3.

A test piece part, which incorporates thick and thin sections, cores, cantilevered portion, etc., was injection molded using feedstock that contains the above formed binder and carbonyl iron powders in a proportion of 35:65 by volume. Binder removal from the green part was completed using the heating profile shown in FIG. 2. The total debinding time was approximately 8 hours and the part retained the shape, free of any defects.

EXAMPLE 2

Polypropylene, paraffin wax, microcrystalline wax and stearic acid were selected as candidate binder components. A binder was formulated that had a composition as follows:

| MATERIAL | W.T. % |
|---|---|
| PP | 45 |
| PW0.5 | 25 |
| MC WAX | 25 |
| STEARIC ACID | 5 |

Figure 4:
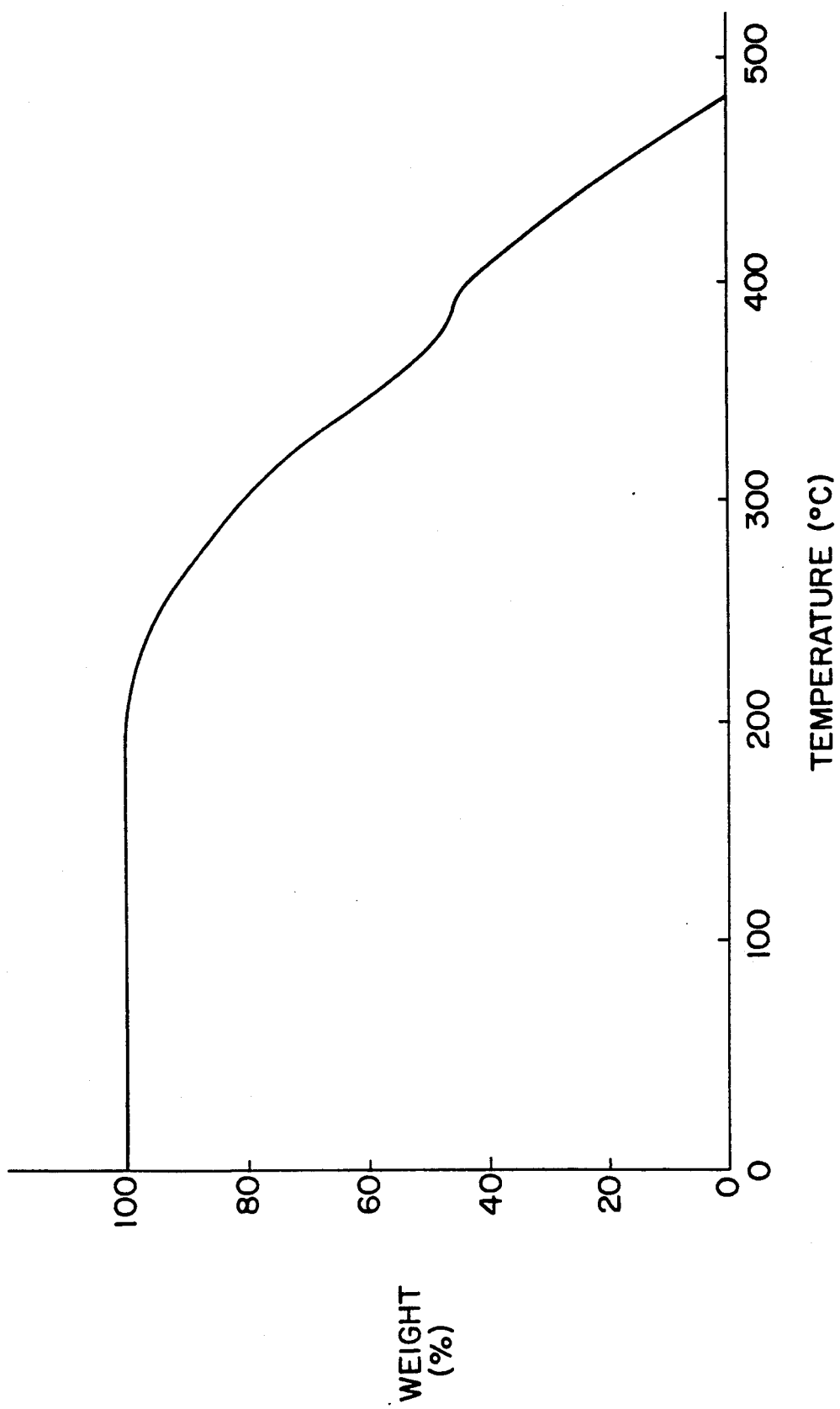
FIG. 4 is a graph of a thermogravimetric analysis profile of the binder of Example 2.

The TGA profile of the binder is shown in FIG. 4.

The same test piece as used in Example 1 was injection molded using feedstock that contains the binder and carbonyl iron powders in a proportion of 36:64 by volume. Binder removal from the green part was completed using the heating profile shown in FIG. 2. The total debinding time was approximately 9 hours.

While the present invention has been described with a certain degree of particularity with reference to the embodiment and examples, many modifications ansd variations will immediately become apparent in the light of the above teachings. It is therefore the intention that the appended claims be interpreted as broadly as possible in view of the prior art to include all such variations and modifications.

What is claimed is:

1. A method of formulating a binder employing a weight loss versus temperature profile as set forth in FIG. 1 to determine the formulation of the binding materials so that the mixture of said materials has a compound weight loss versus temperature profile comprising the profile in FIG. 1 in the range of 200° to 500° C.

2. A binder made by the method of claim 1 used for shaping articles from particular materials comprising multi-component thermoplastic materials, each of which has percentage that is determined by its thermogravimetric analysis profile.

3. A method of binder formulation, comprising steps as follows:
   Step 1: Providing a weight loss versus temperature profile for the binder to be formulated as set forth in FIG. 1;
   Step 2: Selecting binder component materials;
   Step 3: Determining thermogravimetric analysis of the binder
   Step 4: Using the thermogravimetric analysis profiles of the candidate binder materials and said weight loss versus temperature profile in claim 1 to determine the quantity of each constituent binder material such that the compound's weight loss versus temperature profile follows the weight loss versus temperature profile in claim 1;
   Step 5: Making a trial formulation with the binder materials determined in Step 4;
   Step 6: Performing thermogravimetric analysis of the formulated binder in Step 5;
   Step 7: Searching for additional binder material to minimize or eliminate plateaus existing in the TGA profile of the trial formulated binder; and
   Step 8: Repeating Step 4 until the formulation is complete.

4. The method of formulating a binder as set forth in claim 1 wherein the binder is initially heated up to a temperature 10° to 50° C. above the highest melting point of the binder component, the heating being accomplished at a rate of 300° to 500° C/h.

* * * * *

UNITED STATES PATENT AND TRADEMARK OFFICE
CERTIFICATE OF CORRECTION

PATENT NO. : 5,332,543
DATED : July 26, 1994
INVENTOR(S) : Zhang et al.

It is certified that error appears in the above-identified patent and that said Letters Patent is hereby corrected as shown below:

In column 6, at line 2 after "Determining thermogravimetric analysis of the binder" add -- materials; --

Signed and Sealed this

Eighteenth Day of April, 1995

Attest:

Attesting Officer

BRUCE LEHMAN

Commissioner of Patents and Trademarks